United States Patent [19]
Wachi

[11] Patent Number: 6,038,207
[45] Date of Patent: Mar. 14, 2000

[54] OPTICAL DISK CAPABLE OF INHIBITING FROM RENTAL USE

[75] Inventor: Shigeaki Wachi, Kanagawa, Japan

[73] Assignee: Sony Corporation, Tokyo, Japan

[21] Appl. No.: 08/846,777

[22] Filed: Apr. 30, 1997

[30] Foreign Application Priority Data

May 10, 1996 [JP] Japan .............................. P08-116315

[51] Int. Cl.[7] ................................................... G11B 7/24
[52] U.S. Cl. ..................................... 369/275.1; 369/275.4
[58] Field of Search .............................. 369/275.1, 275.4,
369/275.2, 13, 116, 110; 300/59, 114; 430/320,
321; 346/135.1

[56] References Cited

U.S. PATENT DOCUMENTS

| | | | |
|---|---|---|---|
| 4,360,908 | 11/1982 | Howe et al. | 369/109 |
| 4,527,173 | 7/1985 | Gupta et al. | 346/135.1 |
| 4,538,159 | 8/1985 | Gupta et al. | 346/135.1 |
| 4,577,306 | 3/1986 | Howe et al. | 369/109 |
| 5,304,440 | 4/1994 | Ono et al. | 430/21 |

FOREIGN PATENT DOCUMENTS

| | | |
|---|---|---|
| 0163397 A1 | 12/1985 | European Pat. Off. . |
| 0296716 A2 | 12/1988 | European Pat. Off. . |
| 0463413 A2 | 1/1992 | European Pat. Off. . |
| 0515219 A2 | 11/1992 | European Pat. Off. . |
| 0593305 A2 | 4/1994 | European Pat. Off. . |
| 0643391 A1 | 3/1995 | European Pat. Off. . |

OTHER PUBLICATIONS

Patent Abstracts of Japan, vol. 017, No. 457 (P–1597), JP 5–101471, Published Apr. 23, 1993.

Patent Abstracts of Japan, vol. 095, No. 004, JP 7–006368, Published Jan. 10, 1995.

*Primary Examiner*—Tan Dinh
*Attorney, Agent, or Firm*—Limbach & Limbach L.L.P.

[57] ABSTRACT

A recording medium and technique which reduces problems relating to copyright, reduces the necessity for collecting an optical disk for, e.g., rental use and enables the optical disk itself to be inhibited from rental use. A reflectance of a reproducing film of the optical disk is changed by an irradiating laser beam having a greater strength than the laser beam strength used to form the film. The depth of a pre-pit in a data section is set to less than a quarter of the wavelength of the laser beam and the reproducing film is composed such that its reflectance drops if it is irradiated by the laser beam having the greater strength.

11 Claims, 10 Drawing Sheets

OPTICAL DISK CAPABLE OF INHIBITING FROM RENTAL USE

BACKGROUND OF THE INVENTION

1. Field of the Invention

This invention relates to a recording medium capable of reproducing recorded information optically, an optical information reproducing apparatus for reproducing recorded information stored in the recording medium and a seek method using the optical information reproducing apparatus.

2. Description of the Prior Art

Conventionally, there have been such optical disks which are recording media capable of optically reproducing recording data. For example as a rewritable optical disk, there are magnetic optical disks (MO disk, including so-called MD (mini-disk: trade mark)) and phase change type optical disk and the like. As a disk capable of recording only once, write once read many (WOR) disk is available and as a optical disk designed for read only, so-called CD-ROM and the like are currently marketed.

With respect to the aforementioned rewritable optical disks, a number of rewrites is for example about $10^6$ times and a number of reproduction is for example about $10^9$ times. In optical disks in which recording can be performed only once, a number of recording is only one and a number of reproduction is for example about $10^9$ times. In optical disks designed for read only, a number of recording is one and a number of reproduction is theoretically unlimited.

All the aforementioned various optical disks contain a problem relating to copy right. That is, even if for example recorded data is processed with scramble or the like for only users having an appropriate privilege of use in viewpoints of copy right so as to resolve the scramble and reproduce the recorded data, if anyone obtains a means for resolving that scramble, he can pick up the recorded data freely even if he is not a person having an appropriate privilege in terms of copy right.

Further, anyone can pick up recorded data unlimited times from optical disks for use for distribution purpose, for example, optical disks permitted to be for example rented. Thus, it is necessary to collect these optical disks if an appropriate term is passed. That is, although a user having a permission to rent an optical disk can be said to be a proper privileged person for use of that optical disk within a rental period, if that rental period is passed, he loses his privilege for proper use. Thus, that optical disk must be collected. Further, there is a case in which an appropriate optical disk is not desired to be rented for the reason of copy right.

SUMMARY OF THE INVENTION

The present has been proposed to solve these problems. Therefore, an object of the present invention is to provide a recording medium which is capable of reducing problems relating to copy right and if the recording medium is an optical disk permitted to be used for rental, reducing a necessity of collecting that optical disk, and further enabling the optical disk itself to be inhibited from rental use.

According to one aspect of the present invention, there is provided a recording medium having pits in which information is reproduced by irradiating beam on the pits, the recording medium further containing reproducing films for generating the pits in which reflectance thereof is changed by irradiating a laser beam having a higher strength than a predetermined value.

According to another aspect of the present invention, there is provided a recording medium wherein the reflectance of the reproducing film drops when a laser beam having a higher strength than the predetermined value is irradiated.

According to still another aspect of the present invention, there is provided a recording medium further comprising address sections for recording address information and data information sections for recording data information by means of the pits.

According to a further aspect of the present invention, there is provided a recording medium wherein the data information sections are generated by the pits and depth of the pits is between $\lambda/8+n\,\lambda/2$ and $\lambda/6+n\,\lambda/2$ (n is an integer except 0) assuming a wavelength of the laser beam to be 1.

According to a still further aspect of the present invention, there is provided a recording medium wherein the address information sections are generated by the pits and depth of the pits is between substantially $\lambda/4+\lambda/2$ (n is an integer except 0) assuming a wavelength of the laser beam to be 1.

According to a yet still further aspect of the present invention, there is provided a recording medium further comprising a groove at least on one side of both sides of the pit in laser beam scanning direction, the address information sections being formed by forming the grooves in wobbling shape.

According to a still further aspect of the present invention, there is provided a recording medium further comprising grooves on both sides of the pit in laser beam scanning direction, the grooves being substantially $\lambda/8$ in depth assuming the wavelength of the laser beam to be 1.

According to a still further aspect of the present invention, there is provided a recording medium wherein the address information sections are formed by wobbling the pits.

According to a still further aspect of the present invention, there is provided a recording medium wherein the reproducing film includes a first layer made of Sb2Se3, a second layer made of Bi2Te3 and a third layer made of Sb2Se3 and when laser beam is irradiated on the reproducing film, the first layer, the second layer and the third layer are melted, mixed and alloyed so as to change reflectance.

According to a still further aspect of the present invention, there is provided a recording medium wherein the address information sections and the data information sections are formed by the pits and a spatial frequency in which the pit in the address information section is read out by the laser beam is set to be lower than a spatial frequency in which the pit in the data information section is read out by the laser beam.

According to a still further aspect of the present invention, there is provided a recording medium further comprising another reproducing film whose reflectance is changed if a laser beam having a higher strength than the predetermined value is irradiated, the another reproducing film being formed on a side opposite to the side having the reproducing film.

According to a still further aspect of the present invention, there is provided a recording medium reproducing apparatus for reading information optically from a recording medium, comprising: an optical head for irradiating optical beam on the recording medium; a light detecting means for receiving light reflected from the recording medium and outputting a detecting signal; a demodulating means for demodulating the detecting signal and outputting a demodulated signal; an error correcting means for detecting errors in the demodulated data signal, correcting the error and outputting reproduced data signals; and a reproducing beam power control means for controlling beam power of reproducing light beam to be irradiated from the optical head.

According to a still further aspect of the present invention, there is provided a recording medium reproducing apparatus further comprising a seek means for seeking the optical head at a desired position, the reproducing beam power control means controlling so as to irradiate light beam from the optical head at a first laser power at the time of ordinary reproduction and controlling during seek operation so as to irradiate the light beam from the optical head at a second laser power which is smaller than the first laser power.

According to a still further aspect of the present invention, there is provided a method for seeking said optical head at a desired position on the recording medium, comprising: a light beam irradiating process for irradiating light beam from the optical head to the recording medium; a light detecting process for receiving a light reflected from the recording medium and outputting detecting signals; a demodulating process for demodulating the detecting signals and outputting demodulation data signals; an error correcting process for detecting errors in the demodulation data signals, correcting the errors and outputting reproduced data signals; a seek process for seeking the optical head at a desired position on the recording medium; a first control process for controlling so as to irradiate light beam from the optical head at a first laser power at the time of ordinary reproduction; and a control process for controlling during seek operation so as to irradiate light beam from the optical head at a second laser power which is smaller than the first laser power.

DETAILED DESCRIPTION OF THE PREFERRED EMBODIMENTS

Hereinafter, preferred embodiments of the present invention will be described with reference to the accompanying drawings.

Figure 1:
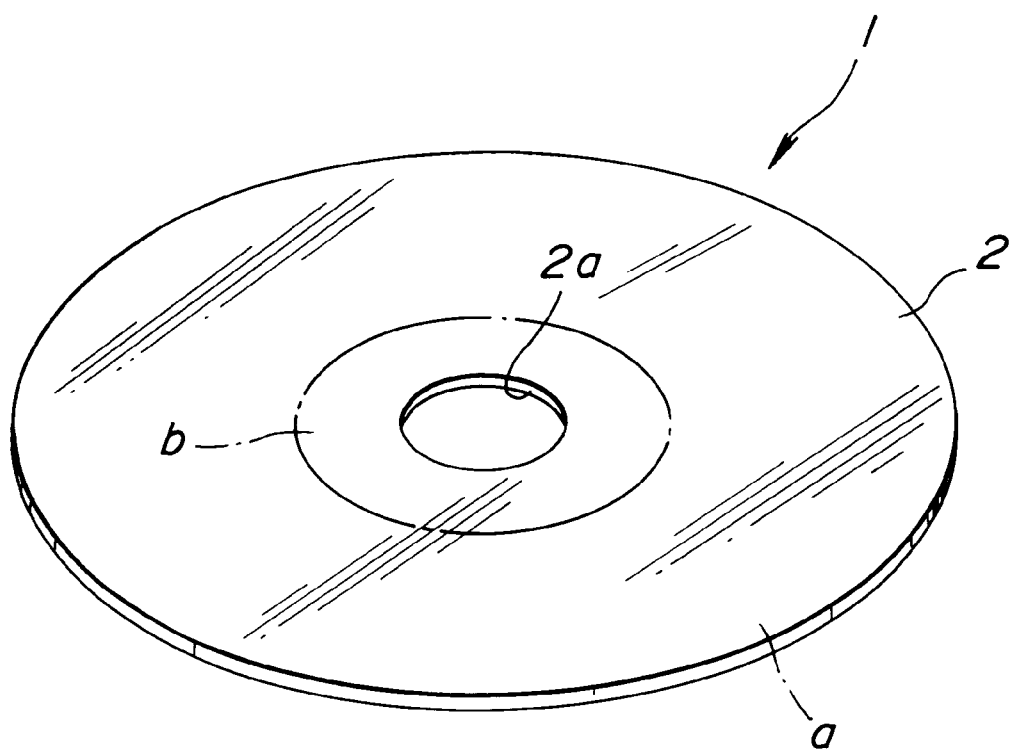
FIG. 1 is a perspective view of an optical disk according to the present invention.

FIG. 1 shows an optical disk which is an example of a recording medium according to the present invention.

Referring to the same Figure, reference numeral 1 designates an optical disk belonging to compact disk (CD) such as CD-ROM and the like, which includes a central hole 2a made to open to both sides of the disk, a recording area a in which for example code information is recorded and a non-recording area (clamping area) extending around the opening portion of the central area 2a.

Figure 2:
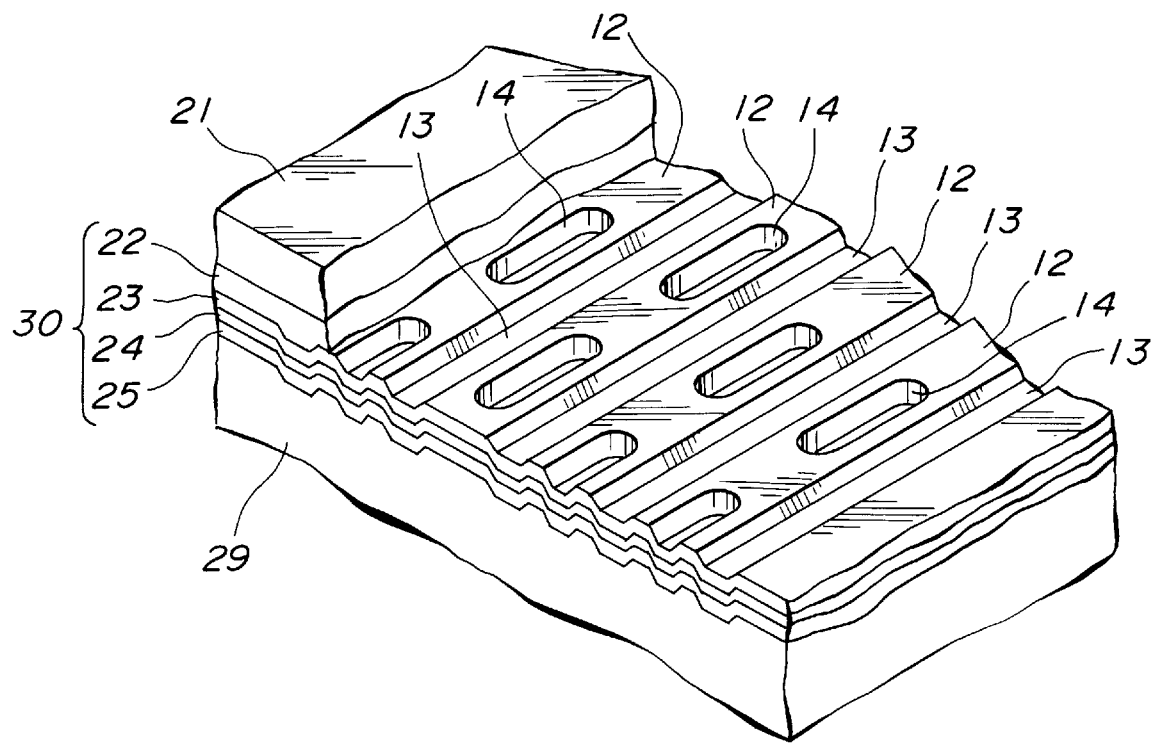
FIG. 2 is an enlarged perspective view partially broken of the optical disk shown in FIG. 1.

FIG. 2 is an enlarged perspective view partially broken of the optical disk 1 shown in FIG. 1. Referring to FIG. 2, the optical disk 1 according to the present invention includes a substrate 29 made of transparent material such as for example polycarbonate or the like, reproducing film 30 in which signals are recorded by means of pre-pit and the recorded signals are reproduced by irradiating laser beam thereon, and protective film 21 for protecting the reproducing film 30, as its prominent factors, and these elements are stacked in shape of layers.

The optical disk according to the present invention has tracks 12 and grooves (guiding groove) 13 on the reproducing film 30, and further the tracks 12 have pits 14 formed as the pre-pit. That is, this pit 14 is formed by stamping according to a master disk in which signals are preliminarily recorded by means of pits when this optical disk is produced. Thus, by irradiating laser beam on the track 12 in which the pits are formed, its reflected beam is read out so that signals recorded in that optical disk can be reproduced. Meanwhile, this type of signal reproduction method for the optical disks has been already known in optical disk apparatus for CD-ROM.

Figure 3:
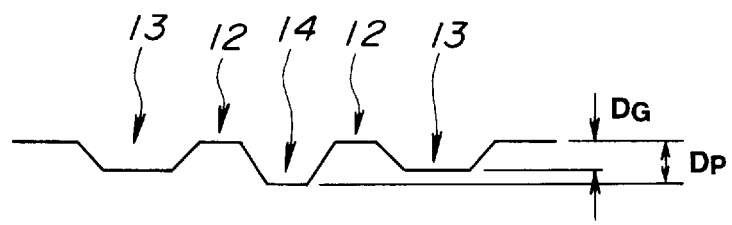
FIG. 3 is a diagram for explaining a relation between a groove and a pit of an optical disk according to the present invention.

FIG. 3 shows a sectional view of the optical disk shown in FIG. 1 in a direction of the radius. Assuming that the wave length of the aforementioned laser beam is $\lambda$, in the optical disk 1 according to the present invention, a depth $D_G$ of the aforementioned groove 13 is set to $\lambda/8$. On the other hand, in the optical disk 1 according to the present invention, about a depth $D_P$ of the above pit 14 formed on the track 12, a depth of a pit for recording data is $\lambda/8-\lambda/6$ and a depth of a pit for address (e.g., track address, etc.) is set to $\lambda/4$. The depth $D_G$ of the above groove 13 may be of any depth if the condition of $\lambda n/2+\lambda/8$ (n is an integer except 0) is satisfied. The depth $D_P$ of the above pit 14 may be of any depth if the depth of the pit for recording data satisfies $\lambda n/2+\lambda/8-\lambda n/2+\lambda/6$ (n is an integer except 0) and the depth of the pit for address satisfies $\lambda n/2+\lambda/4$ (n is an integer except 0). However, it is desirable to apply the above $D_G=\lambda/8$, $D_P=\lambda/8-\lambda/6$ (for recording data) and $D_P=\lambda/4$ (for address) in which the amplitude of signal waveform becomes maximum when so-called push-pull method is used.

Figure 4:
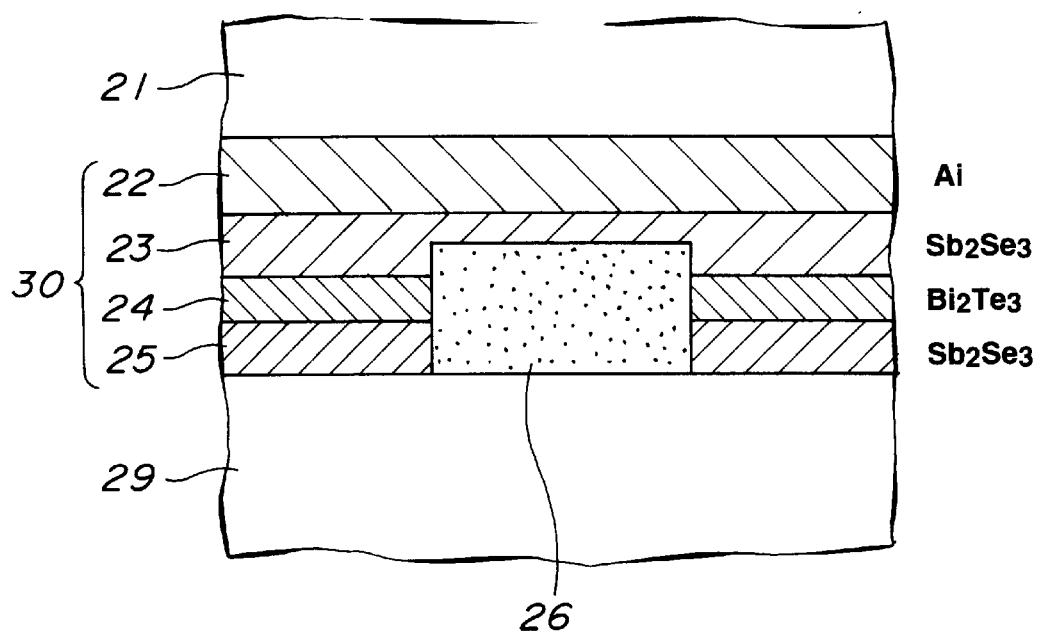
FIG. 4 is a sectional view showing a configuration of a reproducing film of the optical disk according to the present invention.

As shown in FIG. 4, the reproducing film 30 of the optical disk 1 according to the present invention has four layers comprising a reflecting film 22 made of Al for reflecting irradiated laser beam, a first reproducing film 23 made of $Sb_2Se_3$, a second reproducing layer 24 made of $Bi_2Te_3$ and a third reproducing layer $Sb_2Se_3$, these layers being formed on the substrate 29. Although the above first—third reproducing layers 23–25 form separate layers of amorphous condition (non-crystal) prior to irradiation of the above laser beam, if laser beam having a power stronger than a predetermined power is irradiated, these first—third reproducing layers 23–25 are melted and mixed so that they are alloyed if the laser beam is stopped and they are left as they are naturally cooled. That is, as shown in FIG. 4, an area 26 which is naturally cooled after the above laser beam spot is irradiated is not in such a condition in which different layers of the first—third reproducing layers 23–25 are separately formed in amorphous condition, but in such a condition in which materials composing the first-third reproducing layers 23–25 are mixed and alloyed. On the other hand, if the power of irradiated laser beam is less than the above predetermined value, melting and mixing of the first-third reproducing layers 23–25 never occurs or occurs a little.

The above reproducing film 30 produces a different reflectance between then the above first-third reproducing layers 23–25 are in amorphous condition and when they are alloyed. For example, if the reflectance of the reproducing film 30 prior to irradiation of the laser beam having a stronger power than the above predetermined value is assumed to be Rb and the reflectance of the reproducing film alloyed by irradiating the laser beam having a stronger power than the above predetermined value is assumed to be Ra, a relationship of Rb>Ra can be established. On the other hand, if the power of the irradiated laser beam is less than the above predetermined value, melting and mixing of the first—third reproducing layers 23–25 never occurs or occurs a little. Thus, the reflectance Rb and Ra are the same or slightly different from each other. Meanwhile, the above reflectance Rb and Ra can be changed arbitrarily by changing a ratio in film thickness among the first—third reproducing layers 23–25. For example, such a relationship can be changed to Rb<Ra.

For the reasons described above, in a case in which the reflectance of the above reproducing film 30 is changed from Rb to Ra (Rb>Ra) by irradiation of laser beam having a stronger power than a predetermined value, assuming that a degree of modulation of the above address section prior to the irradiation of the laser beam is $L_{Ab}$ and a degree of modulation of the address section after the irradiation of the laser beam is $L_{Aa}$, a relation of the degrees of modulation $L_{Ab}$ and $L_{Aa}$ just before and after the irradiation of the laser beam is $L_{Ab}>L_{Aa}$. The above degree of modulation $L_{Ab}$ corresponds to a level of a reproduced signal waveform which is obtained at the address section when initially laser beam is irradiated upon the address section. The above degree of modulation LAa corresponds to a level of a reproduced signal waveform which is obtained just when the laser beam is irradiated on the address section and then the laser beam is irradiated on that address section again.

In a case in which the reflectance of the above reproducing film 30 is changed from Rb to Ra (Rb>Ra) by irradiation of laser beam having a stronger power than a predetermined value, assuming that a degree of modulation of the above data section prior to the irradiation of the laser beam is $L_{Db}$ and a degree of modulation of the address section after the irradiation of the laser beam is $L_{Da}$, a relation of the degrees of modulation $L_{Db}$ and $L_{Da}$ just before and after the irradiation of the laser beam is $L_{Db}>L_{Da}$. The above degree of modulation $L_{Db}$ corresponds to a level of a reproduced signal waveform which is obtained at the data section when initially laser beam is irradiated upon the data section. The above degree of modulation $L_{Da}$ corresponds to a level of a reproduced signal waveform which is obtained just when the laser beam is irradiated on the data section and then the laser beam is irradiated on that data section again.

Figure 5:
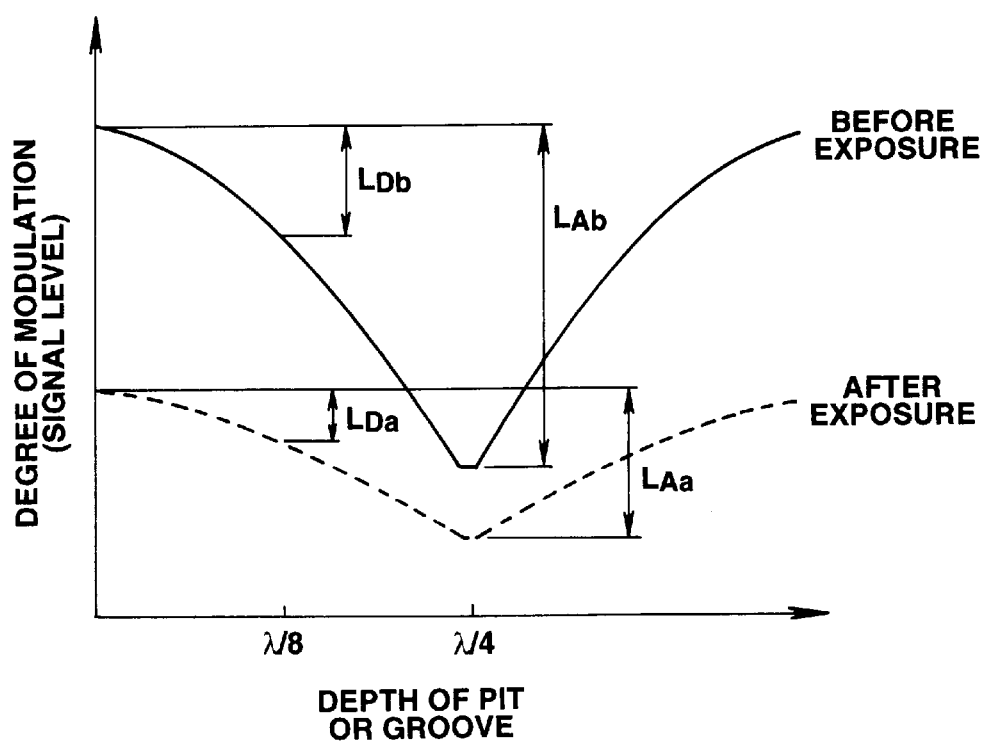
FIG. 5 is a diagram for explaining a relation between the depth of a pit or groove in the optical disk and degrees of modulation before and after irradiation of laser beam according to the present invention.

FIG. 5 shows a relationship between the depth of the pit or groove and the degree of modulation (level of reproduced signal waveform) before (before exposure) and after (after exposure) the irradiation of the laser beam. Referring to FIG. 5, a solid line in the same Figure indicates a relationship between the depth of the pit or groove and the degree of modulation before exposure. The dotted line in the same Figure indicates a relationship between the depth of the pit or groove and the degree of modulation after exposure. As evident from FIG. 5, the degree of modulation is the largest when the depth of the pit or groove is $\lambda/4$ (the level of reproduced signal waveform becomes the largest). As the depth of the pit or groove comes near 0 or $\lambda/2$, the degree of modulation decreases (the level of reproduced signal waveform decreases).

As described above, the pit 14 in the address section is $\lambda/4$ in depth and the pit 14 in the data section is $\lambda/8-\lambda/6$ in depth. Thus, as evident from FIG. 5, in the address section in which the depth of the pit is $\lambda/4$, the degrees of modulation (level of reproduced signal waveform) before and after the irradiation of laser beam are $L_{Ab}$ and $L_{Aa}$ as shown in the same Figure and the degree $L_{Aa}$ of modulation after exposure is a quite large. On the other hand, as evident from FIG. 5, in the data section in which the depth of the pit is $\lambda/8-\lambda/6$ (only $\lambda/8$ is indicated in FIG. 5), the degrees of modulation (level of reproduced signal waveform) before and after irradiation of laser (before and after exposure) are $L_Db$ and $L_Da$ and the degree $L_{Db}$ of modulation before exposure is a quite large. However, the degree $L_{Da}$ of modulation after exposure is very low.

Consider a case in which an optical disk having the reproducing film 30 whose reflectance is changed before and after the irradiation of laser beam as described above will be reproduced with an optical disk reproducing apparatus which has existed from before. Here, assume that error correction capacity (correction capacity of error correction code) in the ordinary optical disk reproducing apparatus is $10^{-3}$ when converted to reproduction signal error rate and assume that an Aderror rate of a reproduction signal in which a pit of the data section having the degree of modulation $L_{Db}$ before irradiation of laser beam is reproduced is $10^{-4}$ and further assume that an error rate of a reproduction signal in which a pit of the data section having the degree $L_{Da}$ of modulation after irradiation of laser beam is for example $10^{-2}$, the ordinary optical disk reproducing apparatus having only an error correction capacity of up to $10^{-3}$ under the above error rate cannot correct errors in signals reproduced from a pit in the data section after the irradiation of laser beam although it can correct errors in signals reproduced from a pit in the data section before the exposure of laser beam. On the other hand, as shown in FIG. 5, because the degree of modulation before and after the irradiation of laser beam in the address section is larger than the degree of modulation before and after the irradiation of laser beam in the data section, the above ordinary optical disk reproducing apparatus can correct errors in signals reproduced from a pit in the address section at any time before and after the irradiation of laser beam.

This means that if the optical disk according to the present invention is reproduced with an ordinary optical disk reproducing apparatus, its data section can be reproduced only once but it cannot be reproduced second times and after because error correction is disabled. On the other hand, it is meant that the address section can be reproduced second times and after. In other words, if the depth $D_P$ of the pit in the data section is set so as to obtain such a degree of modulation in which the error rate of a reproduction signal after the irradiation of laser beam exceeds the error correction capacity of the above optical disk reproducing apparatus and further the reflectance Rb and Ra of the reproducing film 30 are set in such a manner, that data section can be designed so as to be reproducible only once but not to be reproducible second times and after.

In this manner, if that optical disk is relating to a particular copy right, a possibility of picking out data stored in that optical disk unlimited times is eliminated. If that optical disk is designed for distribution to unlimited destinations, a necessity of collecting those optical disks is eliminated. Further, because the optical disk according to the present invention can allow to reproduce its data only once as described above, it is not suitable for rental use presuming plural uses. Thus, this optical disk is effective in such a case in which that disk is not desired to be used for rental for the reason of copy right.

Figure 6:
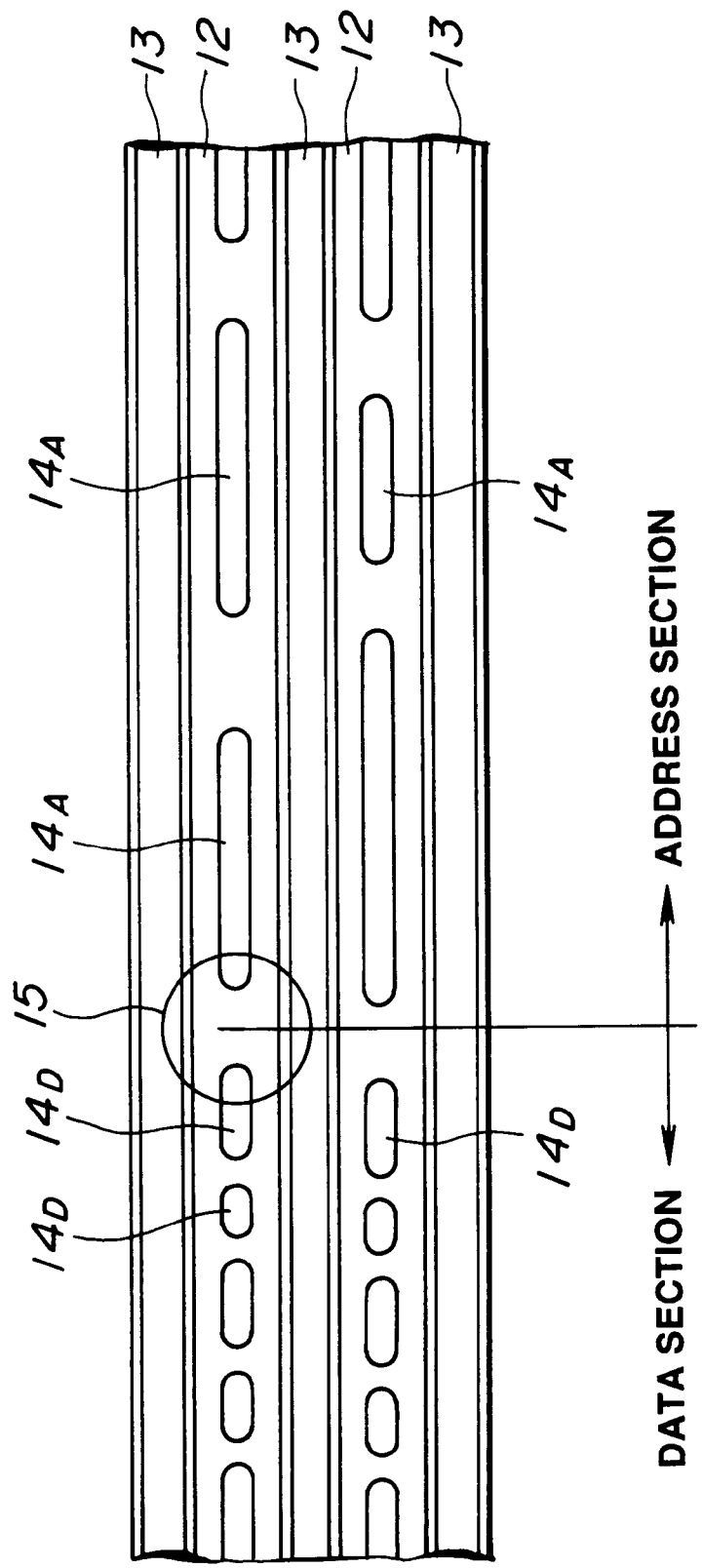
FIG. 6 is a diagram for explaining the spatial frequency of a pit in the address section and the spatial frequency of a pit in the data section.
Figure 7:
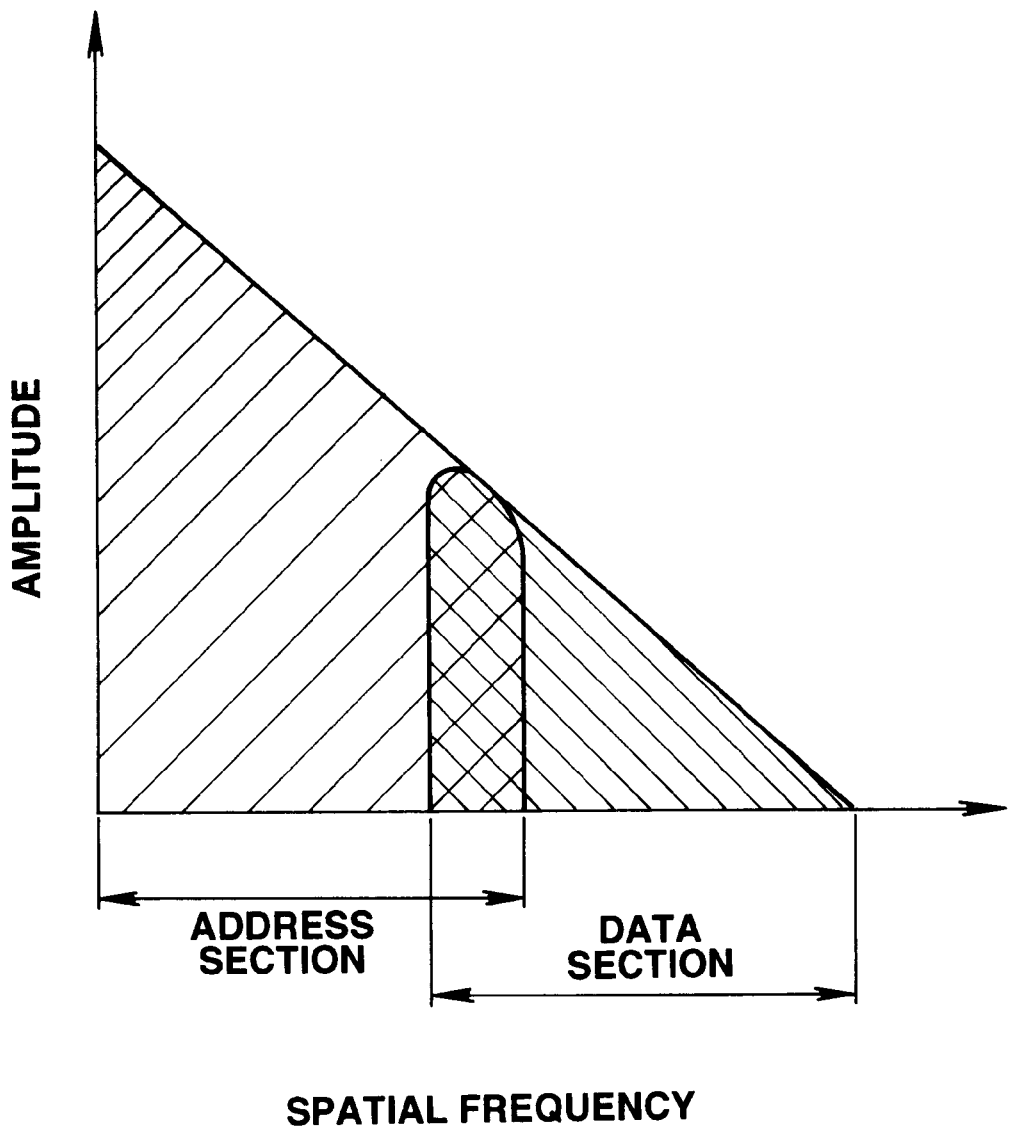
FIG. 7 is a diagram showing a relation between the spatial frequency of the address section and the spatial frequency of the data section and amplitude.

Next, the optical disk according to the present invention has the aforementioned reproducing film 30 and as shown in FIGS. 6 and 7, respective pits $14_D$ for recording data are allocated on the track 12 such that their spatial frequency (MTF) is high. On the other hand, respective pits $14_A$ for the address are allocated such that their spatial frequency is low. That is, in the optical disk according to the present invention, signal components of the recording data are concentrated on high frequency band side so as to increase recording density of the data section on the track 12. On the other hand, the signal components of the address are concentrated to low frequency band side so as to decrease the recording density of the address section. FIG. 6 shows the allocation of pits on a boundary between the data section and the address section and further indicates laser spot 15. Further FIG. 7 shows a relation of spatial frequency in the address section and the data section. Because in the optical disk according to the present invention, as described above, the depth of the pit in the address section is $\lambda/4$ and the depth of the pit in the data section is $\lambda/8-\lambda/6$, the amplitude of reproduced signal waveform is large in the address section and small in the data section as shown in FIG. 7.

Figures 8A, 8B:
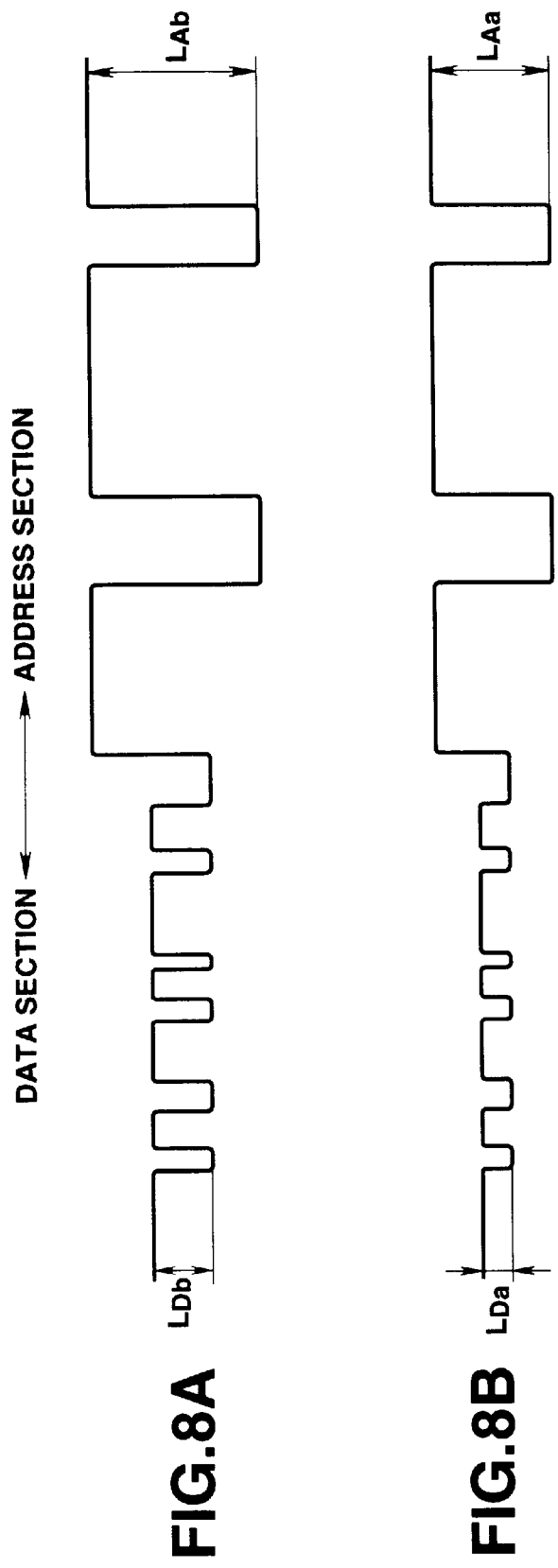
FIG. 8 is a waveform diagram for explaining reproduced signal waveforms in the address section and data section before and after irradiation of laser beam and levels thereof.

As described above, the spatial frequencies for the data section and the address section are divided and as described above, the depth of the pit in the address section is $\lambda/4$ and the depth of the pit in the data section is $\lambda/8-\lambda/6$. As a result, as shown in FIGS. 8A and 8B, the reproduced signals of the address section and the data section can be distinguished easily. If the spatial frequency of the address section is reduced, even if the level of the reproduced signal waveform is lowered as described above, information of that address section can be read out securely. FIG. 8A shows a reproduced signal waveform and level before the irradiation of laser beam (that is, reproduced signal waveform and level obtained from the irradiation of laser beam for the first time) and FIG. 8B shows reproduced signal waveform and level after the irradiation of laser beam (that is, reproduced signal waveform and level obtained by the irradiation of laser beam for the second time and after).

Figure 9:
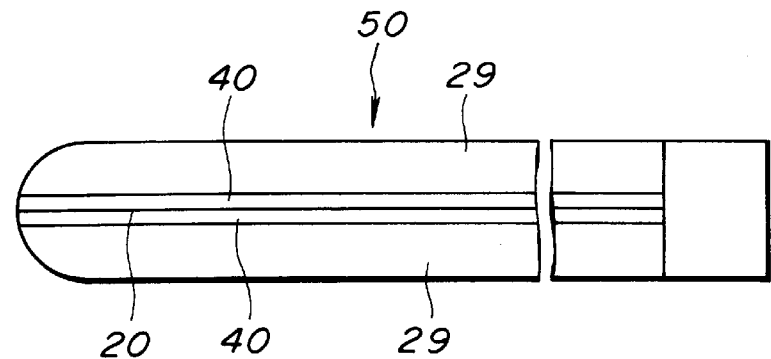
FIG. 9 is a diagram for explaining an optical disk which allows reproduction on both sides.

Further, the optical disk 1 according to the present invention can be modified to be an optical disk 50 which allows reproduction on both sides. In this case, two pieces of the same optical disk having the structure shown in FIG. 1 are prepared and bonded together with the protective films 21 facing each other. That is, two layers indicated by reference numeral 40 in FIG. 9 include the protective film 21 and the reproducing film 30 as shown in FIG. 2. The respective reproducing films 30 are structured to be irradiated by laser beam from both side of the optical disk 50 through substrates 29. Further, by bonding the protective films 21 of the two layers 40 through an adhesive layer 20, the optical disk allowing reproduction on both sides can be realized.

As described above, according to the optical disk of the present invention, software which can be reproduced only once for example (audio, picture, game software, etc.) can be supplied in a form of an optical disk designed for read only which can be produced by stamping from a master disk. Thus, it is possible to achieve protection of copy right further effectively.

Figure 10:
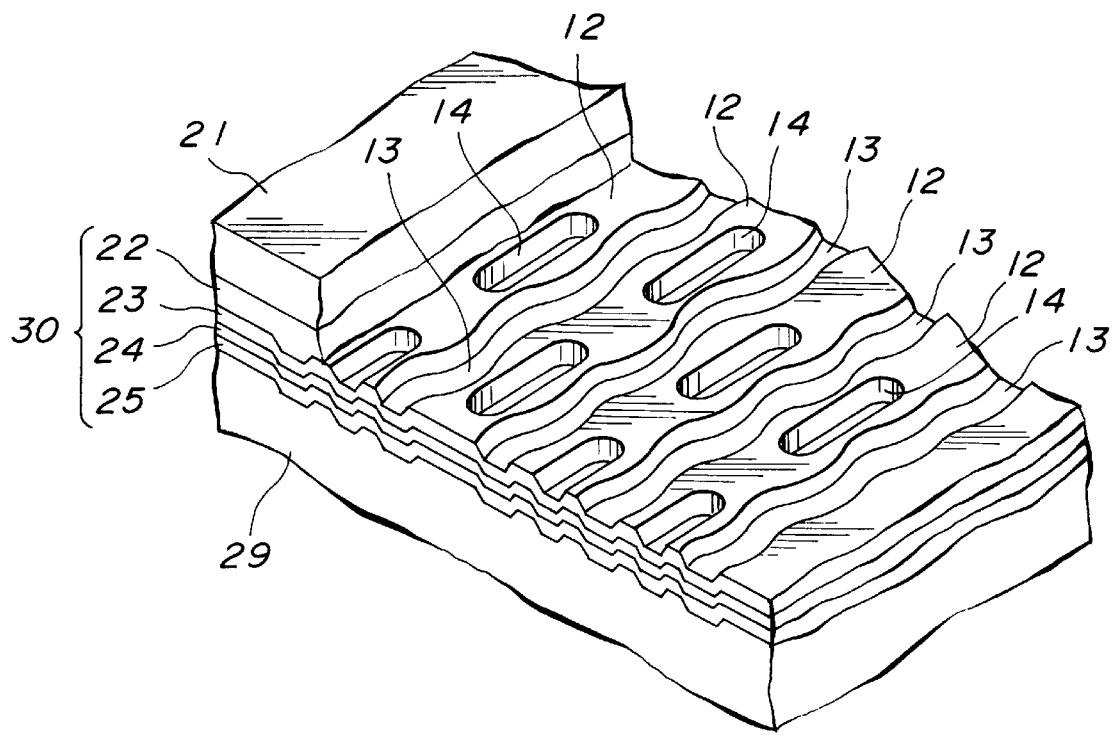
FIG. 10 is a perspective view partially broken of an optical disk in which grooves are formed in wobbling shape.
Figure 11:
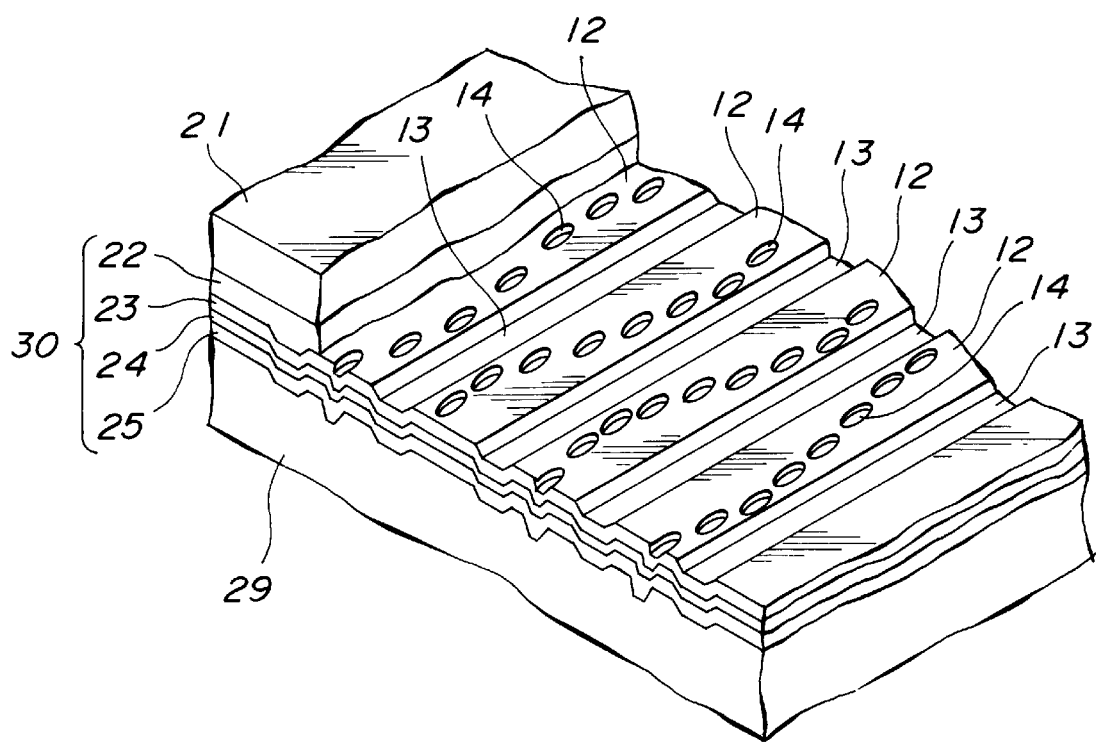
FIG. 11 is a perspective view partially broken of an optical disk in which pits are formed in wobbling shape.

In the above example, it is stated that address information is recorded on the track 12 by means of pre-pit. Different from a case in which the address information is recorded on the track 12 by means of the pre-pit, as shown in FIG. 10 for example, it is possible to achieve recording of the address information by forming the grooves 13 by wobbling and modulating the frequency of that wobbling corresponding to the address information. Further, as shown in FIG. 11, it is possible to record the address information by wobbling an allocation of the pre-pits in a moving direction of the track while the pre-pits are designed for data only. In this case also, by modulating the wobbling frequency of the pre-pits corresponding to the address information, the address can be recorded. In this manner, it is not necessary to form pits for the address on the track 12.

Next, when it is desired to reproduce only data on a particular track of the optical disk, seek is performed. However, laser beam spot during seek operation moves over the data section as well as on the address section. At this time if a power of the laser beam is more than the above predetermined value and the laser beam spot happens to settle on the data section in such a time in which the first-third reproducing layers 23–25 are melted, there is a fear that the data section may be transformed not to be reproducible only by seeking over that portion. An optical disk reproducing apparatus for preventing such a phenomenon will be described with reference to FIGS. 12 and 13. This optical disk apparatus operates so as to drop the lower of laser beam during seek operation to about half at the ordinary reproduction time.

Figure 12:
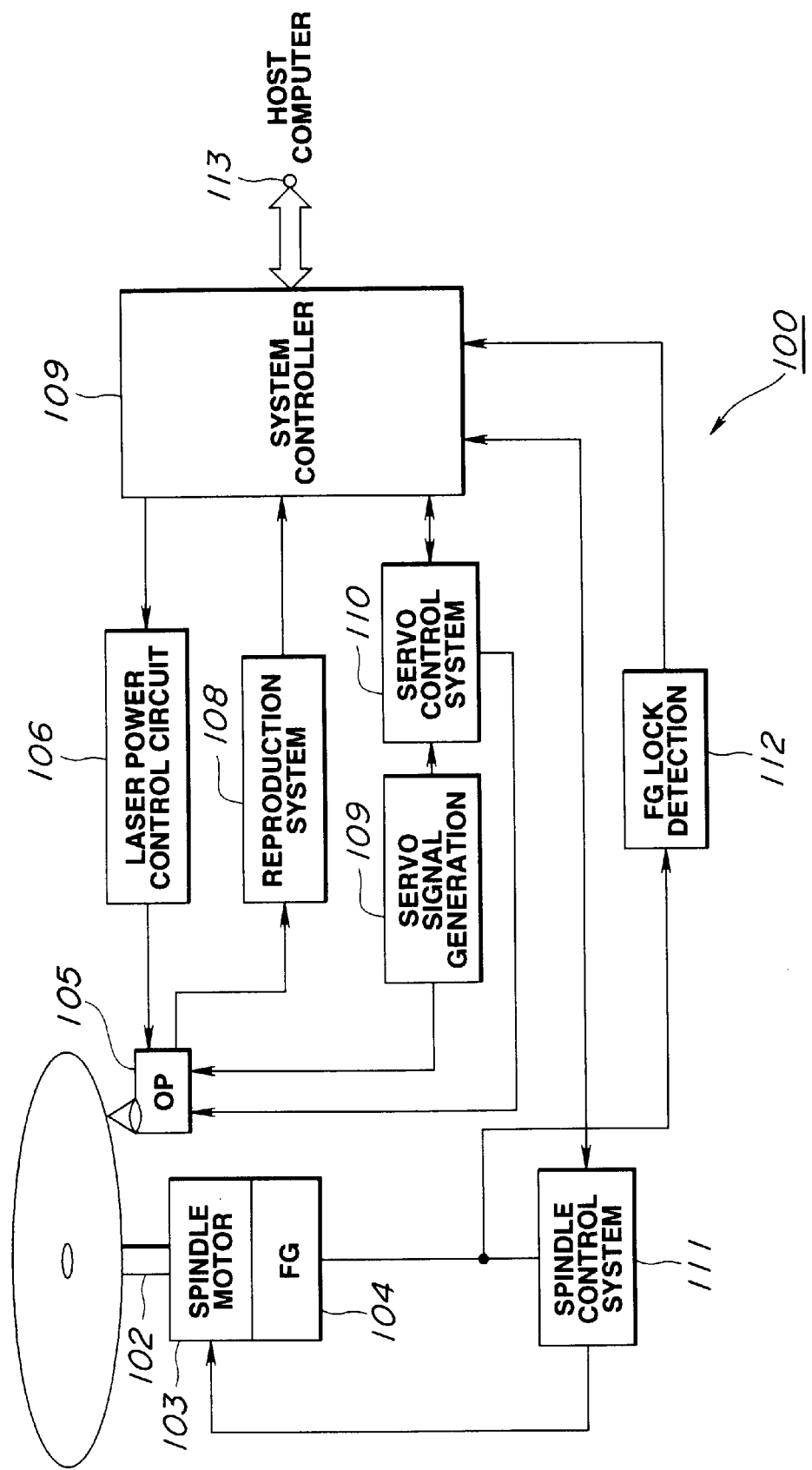
FIG. 12 is an optical disk apparatus for reproducing an optical disk according to the present invention.

FIG. 12 shows a schematic construction of a disk reproducing apparatus 100 for reproducing signals from an optical disk 1 being rotated.

Referring to FIG. 12, an optical disk 1 which is a disk shaped recording medium is driven to rotate by a spindle motor 103 through a shaft 102. This spindle motor 103 contains a FG signal generator for outputting FG signals accompanied by a rotation of the spindle motor 103 by detecting magnetic flux in a magnet. The spindle motor 103 is driven to rotate by spindle drive signals generated by a spindle control system 111 based on the FG signal from the above FG signal generator 104 and subjected to spindle servo.

The spindle control system 111 enables change of rotation speed of the spindle motor 103 by control from a system controller 107. If the optical disk 101 is driven to rotate according to for example zone CAV (angular velocity constant) or zone CLV (linear velocity constant), the rotation speed of the optical disk 101 must be changed for each zone. Thus, the above system controller 107 controls the spindle control system 111 to change the rotation speed of the optical disk 101. At this time, the system controller 107 determines whether the rotation speed of the optical disk 101 reaches a predetermined speed based on FG lock/unlock signals from the FG lock detector 112.

The above FG lock detector 112 determines whether the rotation of the spindle motor 103 is locked by detecting jitters in the FG signal from the FG signal generator 104 and according to a result of this detection, outputs the above FG lock/unlock signals. The above FG lock detector 112 contains PLL (phase-locked loop) circuit for phase-locking the above FG signal by means of the PLL circuit.

An optical head 105 includes an optical part including a laser beam source such as a laser diode and an objective lens, an optical system composed of a photo detector having a beam receiving portion for predetermined pattern and the like, and a biaxial actuator for driving the objective lens vertically or in focusing direction and horizontally or in tracking direction. Further, the optical head 105 is structured so as to be movable in disk diameter direction by means of sledding mechanism comprising a sledding motor and a sledding rail. sledding rail.

In the optical head 105, laser beam projected from the laser diode of the above optical system is concentratedly irradiated on the disk 101 through the objective lens. At this time, the optical head 105 moves the objective lens in the focusing direction by means of the biaxial actuator to focus on a recording surface of the above disk and further moves the objective lens in the tracking direction to apply the focusing point to a track on the recording surface of the above disk. On the other hand, reflected beam from the optical disk 101 is introduced to the above photo detector through the objective lens of the optical system. In this photo detector, the introduced beam is converted to electric signals by photo-electric conversion process.

Output signals from the optical head 105 are transmitted to a servo signal generating circuit 109. This servo signal generating circuit 109 detects for example focus error signals based on so-called astigmatism method or tracking error signals based on push-pull method from the output signals of the optical head 105. The above focus error signals and the tracking error signals from the servo signal generating circuit 109 are transmitted to the servo control system 110.

The servo control system 110 drives the biaxial actuator of the optical head 105 based on the above focus error signal and the tracking error signal to perform focus servo and tracking servo.

Further, the servo control system 110 generates sled drive signals for moving the optical head 105 to a destination position in disk diameter direction based on control from the system controller 109 and transmits this sled drive signal to a sled driver provided on the optical head 105. By receiving the sled drive signal, the sled driver drives the sledding motor of the above sledding mechanism. As a result, the optical head 105 is moved to radius direction of the optical disk 1.

When signals recorded in the optical disk 101 are reproduced in such a state in which the above spindle servo, focus servo and tracking servo are being performed, the disk reproducing apparatus 100 shown in FIG. 12 operates as follows.

Signals read by the optical head 105 from the optical disk 1 are transmitted to a reproduction system 108. This reproduction system 108 demodulates reproduced signals from the optical disk 101 and carries out detection of errors and correction thereof. Signals reproduced by this reproduction system 108 are transmitted to for example host computer which is an external component through a system controller 9 and further a terminal 113.

Figure 13:
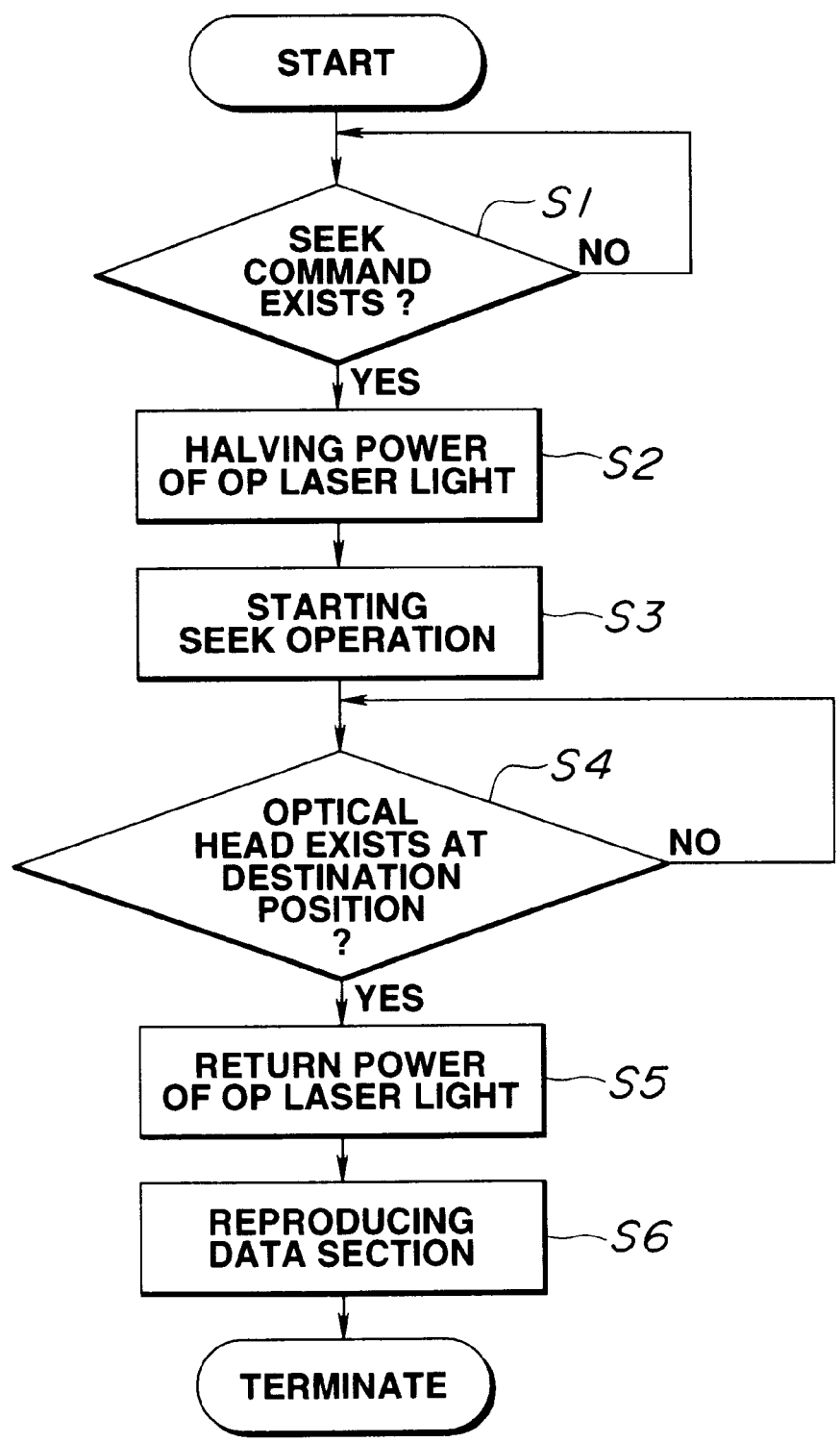
FIG. 13 is a flow chart for explaining a seek operation in the optical disk apparatus according to the present invention.

Here, the seek operation for the optical head 105 to a destination position on the optical disk 1 will be described with reference to FIG. 13.

The system controller 109 determines whether an address for seek destination position and a seek command have been received from the host computer (S1). If the seek command is not received, the processing returns to S1 so that it waits for seek command.

If the seek command is received, the system controller 109 outputs laser power halving signal for halving laser power to a laser power control circuit 106. Correspondingly, the laser power halving circuit 106 controls the laser beam source to halve the laser power to half at the time of reproduction (S2).

Then, the sledding motor is driven to move the optical head toward a destination position on the optical disk to start the seek operation (S3). At this time, the laser power is adjusted to half at the time of reproduction so that even if the data section is irradiated by laser beam during the seek operation, the reproducing layer 30 of the data section is not melted, mixed or alloyed. Thus, there is little possibility that the reflectance may be changed. Namely, data in the data section is not deleted so that it can be read at ordinary reproduction.

Because the depth of a pit for address in the address section is $\lambda/4$, even if the laser power is halved, the current position address of the optical head can be read through the reproduction system 108.

Then, whether or not the current position address of the optical head supplied from the optical head 105 to the system controller 109 through the reproduction system 108 coincides with a destination address transmitted from the host computer together with the seek command is determined (S4). If they do not coincide with each other, a process for determining whether the current position address coincides with the destination address is repeated (S4).

If it is determined that the position address coincides with the destination address, the system controller 109 outputs a laser power restoration signal to the laser power control circuit 106. Correspondingly, the laser power control circuit 106 controls laser beam source to return the laser power to a laser power at the time of reproduction (S5).

By irradiating laser beam at the laser power at the time of reproduction from the destination address position, data in the data section is reproduced. At this time, laser beam of the laser power at this time melts, mixes and alloys the reproducing layer 30 of the data section. Consequently, the reflectance of the reproducing layer 30 drops. That is, data in the data section is deleted so that it cannot be reproduced again.

In such a manner, each time when the seek command from the host computer is transmitted, the above described operation is repeated.

Even if the power of the laser beam is halved, information of the address section can be read out because the address section has a large level in reproduced signal waveform and excellent S/N ratio as described previously. On the other hand, as for the data section, because the data section has originally a small level in the aforementioned reproduced signal waveform and poor S/N ratio, if the laser beam power is reduced to about half at the time of ordinary reproduction, information of that data section cannot be read. However, signals recorded in the data section do not need to be read during seek operation and it is possible to prevent signals in the data section from being disabled to read by the seek operation. Although the laser beam power should be returned to its ordinary power level after the seek operation is completed as stated in the present invention, if there is no opportunity that the laser beam spot settles over the data section for more than a time in which it melts the first-third reproducing layers 23–25, the above described operation of the laser power is not necessary.

As evident from the description performed above, according to the present invention, a reproducing film whose reflectance is changed by irradiating laser beam having a higher strength than a predetermined one is formed, the depth of a pre-pit in the data section in which data is recorded by means of the pre-pits is set to less than a quarter of the wavelength of a laser beam and the reproducing film is composed such that its reflectance drops if it is irradiated by a laser beam having a higher strength than a predetermined level. As a result, the problem relating to copy right can be reduced. For example, for even optical disks permitted to be rented, a necessity of collecting that optical disk can be eliminated and at the same time, it is possible to make that optical disk inhibited from being used for rental.

Further, because the laser power of reproducing optical beam is reduced during seek operation in the recording medium reproducing apparatus according to the present invention, data on the recording medium is never deleted during the seek operation. Further, because the address section can be read by even a week laser power, a destination position can be sought securely.

What is claimed is:

1. A recording medium having pits in which address and data information are formed for reproduction by irradiating a laser beam on said pits, said recording medium further containing a first reproducing film for generating said pits in which reflectance therefrom is reduced by irradiating said laser beam having a higher strength than a predetermined value, wherein a depth of pits in which address information is formed is between $\lambda/8+n\lambda/2$ and $\lambda/6+n\lambda/2$, where n is an integer and $\lambda$ is a wavelength of the laser beam, and wherein a depth of pits in which data information is formed is substantially $\lambda/4+m\lambda/2$, where m is an integer, and wherein a depth of grooves located on either side of said pits in which address and data information is formed is substantially $\lambda/8$, and wherein a spatial frequency of said pits in which address information is formed to be read out by said laser beam is less than a spatial frequency of said pits in which data information is formed to be read out by said laser beam.

2. A recording medium according to claim 1 wherein the reflectance of said reproducing film drops when a laser beam having a higher strength than the predetermined value is irradiated.

3. A recording medium according to claim 1, further comprising an address section for recording address information and a data information section for recording data information by means of said pits.

4. A recording medium having pits in which information is reproduced by irradiating a laser beam on said pits, said recording medium further containing reproducing films for generating said pits in which reflectance therefrom is changed by irradiating a laser beam having a higher strength than a predetermined value, wherein the reflectance of said reproducing film drops when said laser beam having said higher strength than the predetermined value is irradiated, said recording medium further comprising address sections for recording address information and data information sections for recording data information by means of said pits, wherein said data information sections are generated by said pits and a depth of the pits in which data information is formed is between $\lambda/8+n\lambda/2$ and $\lambda/6+n\lambda/2$ (n is an integer except 0) wherein a wavelength of the laser beam is $\lambda$.

5. A recording medium having pits in which information is reproduced by irradiating a laser beam on said pits, said recording medium further containing reproducing films for generating said pits in which reflectance therefrom is changed by irradiating a laser beam having a higher strength than a predetermined value, wherein the reflectance of said reproducing film drops when said laser beam having said higher strength than the predetermined value is irradiated, said recording medium further comprising address sections for recording address information and data information sections for recording data information by means of said pits, wherein said address information sections are generated by said pits and a depth of the pits in which address information is formed is between substantially $\lambda/4$ and $\lambda/2$ (n is an integer except 0) wherein a wavelength of the laser beam is $\lambda$.

6. A recording medium according to claim 4 further comprising a groove at least on one side of both sides of said pit in laser beam scanning direction, said address information sections being formed by forming said grooves in wobbling shape.

7. A recording medium according to claim 4 further comprising grooves on both sides of said pit in laser beam scanning direction, said grooves being substantially $\lambda/8$ in depth wherein the wavelength of said laser beam is $\lambda$.

8. A recording medium according to claim 4 wherein said address information sections are formed by wobbling said pits.

9. A recording medium having pits in which information is reproduced by irradiating a laser beam on said pits, said recording medium further containing reproducing films for generating said pits in which reflectance thereof is changed by irradiating said laser beam having a higher strength than a predetermined value, wherein said reproducing film comprises a first layer made of $Sb_2Se_3$, a second layer made of $Bi_2Te_3$ and a third layer made of $Sb_2Se_3$ and when said laser beam is irradiated on said reproducing film, said first layer, said second layer and said third layer are melted, mixed and alloyed so as to change reflectance.

10. A recording medium having pits in which information is reproduced by irradiating a laser beam on said pits, said recording medium further containing reproducing films for generating said pits in which reflectance therefrom is changed by irradiating a laser beam having a higher strength than a predetermined value, wherein the reflectance of said reproducing film drops when said laser beam having said higher strength than the predetermined value is irradiated, said recording medium further comprising address sections for recording address information and data information sections for recording data information by means of said pits, wherein said address information sections and said data information sections are formed by said pits and a spatial frequency in which the pits in said address information section is read out by said laser beam is set to be lower than a spatial frequency in which the pits in said data information section is read out by said laser beam.

11. A recording medium according to claim 1 further comprising a second reproducing film whose reflectance is changed if a laser beam having a higher strength than the predetermined value is irradiated, said second reproducing film being formed on a side opposite to the side having said first reproducing film.

* * * * *